United States Patent Office 2,754,407
Patented July 10, 1956

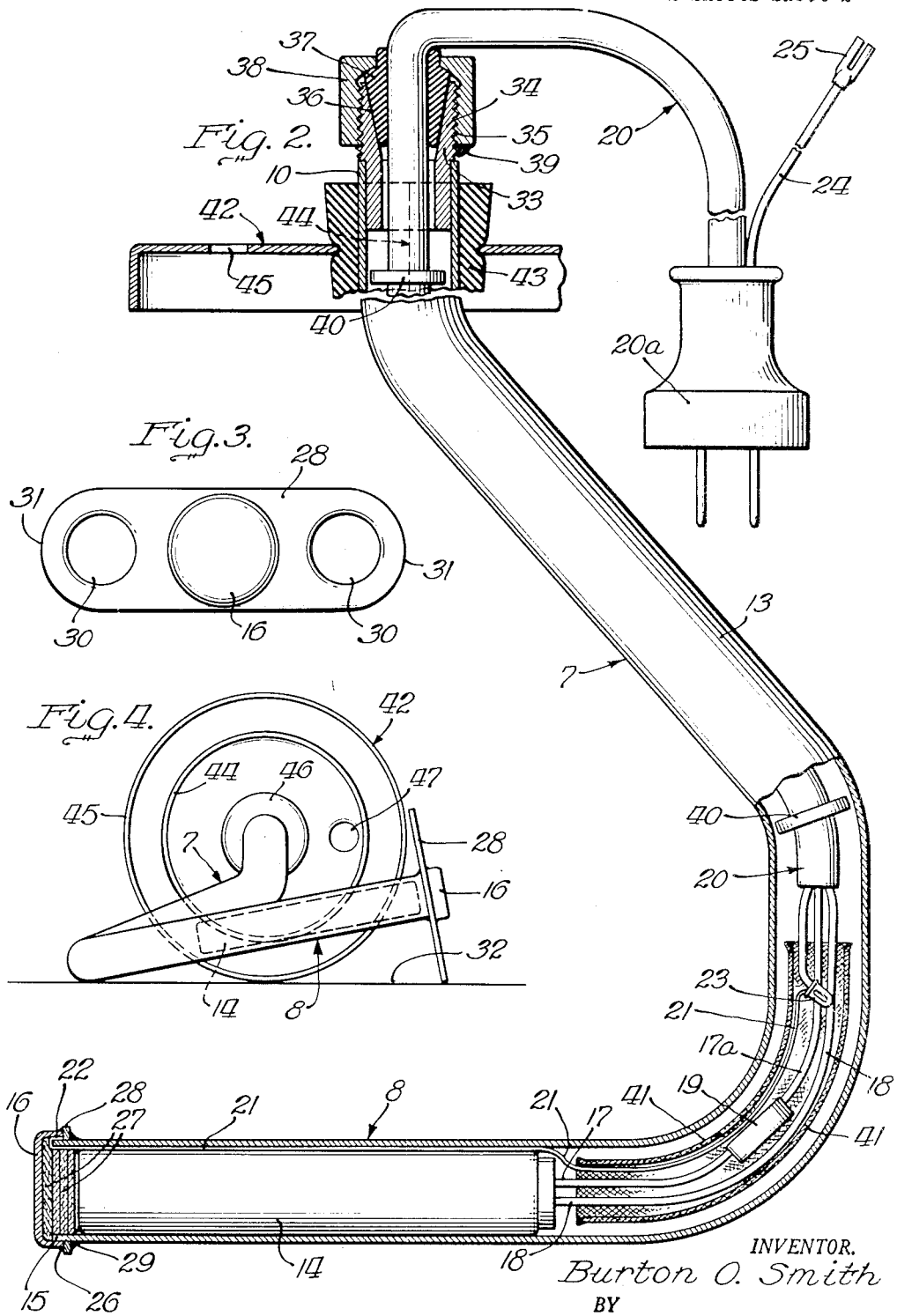

2,754,407

HOT LIQUID DISPENSING MEANS

Burton O. Smith, Chicago, Ill., assignor to Vacuum Can Company, Chicago, Ill., a corporation of Illinois Application June 9, 1954, Serial No. 435,399

12 Claims. (Cl. 219—41)

This invention relates to an improvement in hot liquid dispensing means, that is to say to equipment comprising a container for liquid and a means for heating the liquid in the container. More specifically, the present invention is concerned with equipment of the character indicated which, currently, is usable mainly for dispensing hot liquid foods, for example, soups and coffee, but which may also be used for other liquid heating purposes, such as heating oils, liquid fuels and coating liquids.

In industrial centers, coffee is brewed and other hot liquid foods are prepared in kitchens remote from the place where the food is to be consumed and the hot food is transported from the kitchen to the place of consumption in large cans or containers which are usually insulated in such a way as to aid in maintaining the temperature of the food during its transportation and while it is awaiting consumption so that the purchaser or consumer may be served hot coffee or other liquid food at the proper temperature. Notwithstanding the use of very efficient, insulated containers, it has been found by experience that with the passage of several hours of time, the temperature of the food product in the container often drops below the temperature at which it is preferred to serve the coffee or other liquid. The containers used for the purpose mentioned are usually provided with a suitable dispensing faucet, and the container covers are usually provided with a vent opening to permit air to enter the container so that the liquid will flow out of the faucet when the faucet is open. The entrance of atmospheric air in this matter tends to aggravate the loss of heat so that cooling occurs not only as a mere function of the passage of time but also as a function of the admission of air into the container as an incident to dispensing of the product.

Tests appear to verify that a good grade of coffee, properly brewed, can be heated to a high temperature without causing deterioration, provided that after brewing, its temperature is not allowed to go below a certain minimum, presently considered to be about 135° F. However, a recently developed process for brewing coffee eliminates a certain element which causes the coffee to deteriorate, and this permits brewed coffee to be kept in a cold state for a week or more and then heated without materially impairing its quality. Should this process be commercialized, it may become less necessary to use an insulated container to keep coffee hot during delivery, but a means for conveniently heating the coffee at the place of consumption and for maintaining it hot within a limited temperature range, will be highly desirable.

The main objects of the present invention are to provide liquid dispensing means which can readily be employed for the purpose indicated and in which the content of the container may be effectively maintained close to a selected temperature or at least within a selected range of temperature; to provide for such dispensing means, heating equipment which is independent of the container so that the heating equipment need not be transported with the container; to provide heating equipment for the purpose indicated which may be readily associated with and disassociated from the container without the use of tools or other apparatus; to provide heating equipment of the character indicated which will be generally useful for heating liquid material in containers and which will be durable and safe to use; and in general, it is the object of the invention to provide improved equipment of the character indicated.

Other objects and advantages of the invention will be understood by reference to the following specification and accompanying drawings wherein there is illustrated a liquid heating and dispensing means embodying a selected form of the invention.

In the drawings:

Fig. 2 is an elevational view of the heating unit, certain portions being shown in section to more clearly illustrate the construction;

Fig. 3 is an elevation of one end of the heating device; and

Fig. 4 is an end elevation illustrating a safety factor built into the heating unit.

Figure 1:
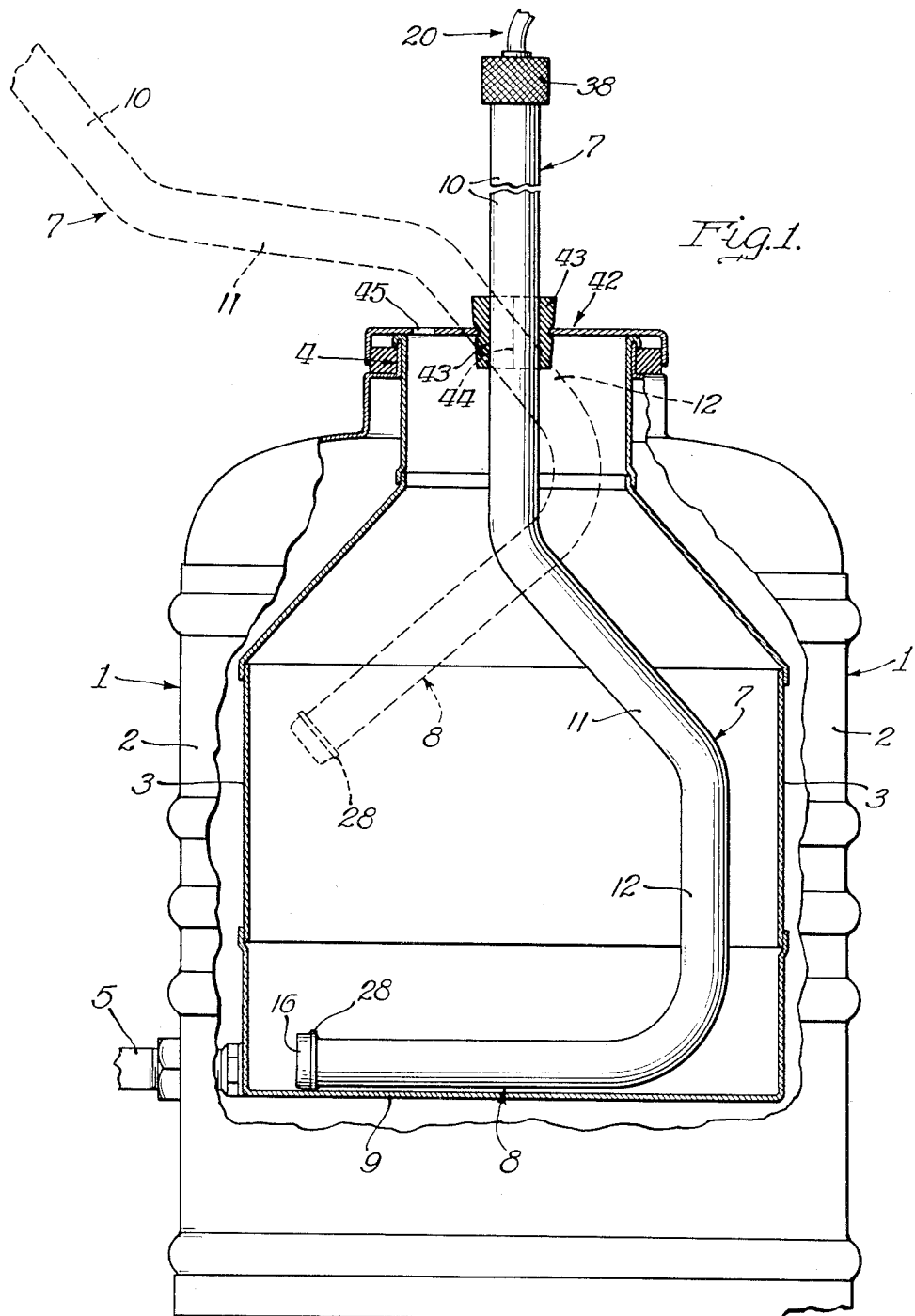
Fig. 1 is an elevational view in which certain portions have been broken away and others shown in section to more adequately illustrate certain details of the improved equipment.

The liquid heating and dispensing means shown by way of example in the drawings, comprises a container 1 having outer and inner containers 2 and 3 respectively, the inner container being spaced from the outer container and the space between the containers being vacuumized so that the container is a vacuum insulated structure. Hence, the inner container 3 is capable of holding a liquid product close to a given temperature for a considerable period of time. However, even though the vacuum drawn is of a high order, over a period of hours, some temperature loss is experienced, the necessary connections between the inner and outer containers, for example, at the neck or mouth 4, and other factors above mentioned, causing heat losses. The container is provided with a faucet connection 5 through which the content of the inner container is adapted to be dispensed.

The container need not be vacuum insulated but may be insulated in any other suitable manner, and in some instances, may even be uninsulated.

It is not practicable to heat material in the inner receptacle of an insulated container by the application of heat to the outside of the container because of the insulation. In kitchens where coffee or other material is prepared, the heating is effected in urns, kettles or other containers and when the product is ready, it is poured hot into the container 3, a cover applied to the mouth end 4 and, in due course, the container dispatched to the place where the product will be dispensed.

As a practical matter, the mechanics of filling the containers with hot liquids, and the distribution thereof from a central kitchen to a large number of places by a single transport, necessarily results in the delivery thereof, with additional time loss between the time of delivery and the time of consumption; during this time loss, a significant drop in temperature of the heated material may be experienced. Furthermore, when dispensing is started, an accelerated drop in temperature is experienced due to the entrance of relatively cold air into the container. Again, in some places it is desired to have a container of hot coffee (for example) available throughout practically the entire working day so that workmen and others may obtain a refreshing cup of hot coffee whenever desired during the day. It has been especially difficult in the latter circumstance to provide coffee at the proper temperature over a span of say six to twelve hours.

According to the present invention, after the container is delivered to the point of consumption, and at any places where the container with a charge of hot liquid is required to stand for a considerable length of time, an immersion heater 7 is placed in the container to supply heat to the content of the latter.

The immersion heater 7 includes a lower horizontal leg portion 8 which is the effective heater portion of the device. Said heater portion 8 is preferably such that it can be placed close to the bottom 9 of the container as shown so that even a very small quantity of liquid remaining in the bottom of the container will be heated by contact with said heater portion 8.

As shown, the heater portion 8 is elongated to a dimension which is substantially in excess of the corresponding dimension of the neck or mouth of the container. In order that the heater portion 8 of the device may be gotten into the container, said heater portion is connected to an upper straight stem portion 10 through the agency of an angular portion 11 and a vertical portion 12 which is parallel to but in offset relation to said upper stem portion 10. The connecting portions 11 and 12 together with the heater portion 8 imparts to the device a gooseneck formation which facilitates movement of the structure into the container through its relatively narrow mouth opening, by more or less endwise movement of the heater portion through said mouth of the container substantially as indicated in broken lines in Fig. 1. The heater may then be adjusted to upright position and its insertion to the position shown in full lines completed, said upper stem portion 10 being then substantially coaxial with the container and the heater portion 8 located on the bottom of the container approximately centrally thereof in T-forming relation to said stem portion. The gooseneck form of the device thus facilitates insertion of a heater portion which is too large to pass through the mouth of the container except in a more or less endwise direction as indicated.

The details of construction of the heating device 7 are illustrated in Figs. 2 and 3. As shown in Fig. 2, the heating device comprises a housing tube 13, preferably but not necessarily of stainless steel, said tube being a continuous tube from end to end and bent to provide the desired goose-neck shape. Within the lower or heater end portion 8 of the tube which is substantially perpendicular to the upper stem portion 10 and the portion 12, there is provided an electrical heating cartridge or unit 14 which in one practical embodiment was a 115 volt, 285 watt, alternating current device. Said cartridge fits slidably in said tube so that it may be inserted endwsie into the tube from the free lower end 15 thereof before a cap 16 is applied to said end. Electrical conductors 17 and 18 extend out of said cartridge, the conductor 17 having connected therein, a thermostat-switch device 19 which is activated by temperature changes and which is operative to make and break an electrical circuit in said conductor 17. Said conductors 17 and 18 are embodied in a three conductor cable 20 which extends through said tube 13 and emerges from the upper free end of the stem portion 10 of the device and terminates in an electrical connector plug 20a so that current may be supplied through the thermostat switch unit 19 to the heater unit 14.

For electrically grounding the tube 13, a grounding strap or conductor 21, preferably in the form of a thin flat strip of copper or other suitable conducting material has an end portion 22 hooked over said end 15 of the tube, said conductor 21 being disposed intermediate the heating cartridge 14 and the adjacent wall of the tube 13 and then suitably connected as indicated at 23 to the third conductor of said cable 20. Said third conductor emerges from the plug 20a as indicated at 24 and is provided with a suitable clip 25 by means of which it is adapted to be detachably connected to a prong suitably provided on a part of the grounded metal conduit system which houses the electrical wiring which supplies current through the plug 20a to the heating cartridge. The end portion 22 of the grounding strip is held in good electrical contact with the end portion of the tube 13 by means of the cap 16 which tightly fits telescopically over the end portion 15 of the tube with a normally non-removably press fit. In addition to such press fit, brazing indicated 26 may be provided for insuring permanency of the cap mounting on the tube. Suitable non-conducting and non-burning filler plugs or washers 27 of asbestos or other suitable material are preferably provided intermediate the cap 16 and the adjacent end of the electrical cartridge 14 to keep the cartridge out of direct contact with the cap 16.

A flange member 28 is fastened to the heat generating portion 8 of the device near its free end. This flange 28 may be in the form of a simple flat elongated plate as best shown in Fig. 3, fitted around the tube 13 and brazed or otherwise suitably fastened as indicated at 29 in a permanent manner and in fixed relation to the leg portion 8 of the device. The laterally projecting end portions of the flange 28 are preferably apertured as indicated at 30 to reduce heat conduction from the heater portion 8 to the ends 31 of the flange and to provide air-cooling for said flange ends. This flange structure 28 serves, as shown in Fig. 4, to support the heat generating portion 8 of the device out of contact with any surface 32 on which the device may be laid so that even though the device remains electrically connected to a source of power, the danger of setting fire to the surface 32 is substantially eliminated. It may be observed that experience with a structure such as shown, indicates that the portion of the leg 8 of the tube immediately surrounding the heater cartridge 14 is the only portion which ordinarily becomes hot enough to create a fire danger in the event that the device is laid flatwise on a surface, such as 32, as represented in Fig. 4. Such experience indicates that in the vicinity of the thermostat-switch structure 19 the tube remains relatively cool, that is to say, at a temperature which under normal or average circumstances, is a safe temperature so far as fire danger is concerned. The main heating effect of the device is thus confined substantially to that portion of the length of the heat generating leg 8 which corresponds approximately to the length of the heating cartridge 14. It may be observed that stainless steel such as used in the tube 13 is a relatively poor heat conductor which fact accounts for the localized heating effect indicated.

The thermostat portion of the thermostat-switch 19 is set or made so that it will automatically close an electric circuit at a temperature about 165° F. and so that it will open such circuit at a temperature of about 195° F. It has been found that a thermostat rated to close and open at the respective temperatures mentioned, when in the assembly described, closes when the temperature of the coffee drops to about 165° F., and opens when the coffee temperature reaches about 185° F. The reason for this difference between thermostat operating temperatures and the related coffee temperatures may not be accurately understood but it is believed to be due to the fact that the thermostat, being housed within the tube 13 in proximity to the heating cartridge 14 is subjected to the direct heat radiation from the cartridge 14 and only indirectly to the temperature of the coffee or other liquid in which the device is immersed. It appears that when the heating cartridge 14 is energized the heat radiated directly from the cartridge to the thermostat will heat the thermostat to the upper temperature of 195° F. before a corresponding temperature is imparted to the coffee or other liquid around the outside of the device. Hence, the thermostat at 195° will open the circuit when the liquid reaches a temperature of about 185° F. Similarly, the temperature within the tube 13 in the vicinity of the thermostat appears to drop somewhat faster than does the temperature in the coffee or other liquid around the outside of the tube so that the lower temperature of 165° will be reached within the tube while the liquid content in the container remains at a higher temperature. Whatever the explanation of the difference between the thermostat operating temperatures and the range of temperature in the liquid, the range of liquid temperatures is smaller than the range between the thermostat operating temperatures so that the coffee (or other liquid) is held to a temperature within a comparatively narrow range. This temperature range is a very desirable one in that it permits the coffee to be served, after the temperature loss which occurs from adding cream and pouring into a cold cup, at a temperature which is generally considered most palatable, while the indicated high temperature is not sufficient to cause the coffee to boil or to cause the aroma of the coffee to be dispatched or to otherwise deteriorate the coffee.

As shown in Fig. 2, the upper end of the tube 13 is also sealed, the seal at that end being preferably of a separable form. A brass or other suitable adapter 33 is attached, by soldering or brazing if necessary, to the inside of the upper end portion of the tube 13. Said adapter is provided with an upper end portion 34 which projects from the adjacent end of the tube 13, said projecting portion being externally screw threaded as shown at 35 and internally countersunk as shown at 36. A rubber or other compressible material sleeve or grommet 37 is threaded over the cable 20 and is seated in the countersunk portion 36 of the adapter, and a rigid cap 38 is screwed on the adapter and serves to compress the rubber member 37 into sealing engagement with the countersunk portion of the adapter and the surface of the cable 20. This arrangement is operative to seal the device against the entrance of moisture and to lock the cable 20 against endwise shifting into and out of the tube 13 so that it is impossible to strain the connections between the various conductors, the thermostat-switch and the heating cartridge by pulling on the exposed portion of the cable. To prevent meddling with the structure, the cap 38 may be locked against removal by the application of a blob of solder or brazing as indicated at 39 to bond the cap to the adapter.

One or more spacing collars 40 may be provided on the cable 20 at spaced points along the lengths of the tube to hold the conductor more or less centrally of the tube if desired. However, such support for the conductor is not essential since the tube 13 does not get hot enough, except in the immediate vicinity of the heating cartridge 14, to harm the insulation cover of the conductor cable 20. However, it is preferred that an insulating jacket or sleeve 41 of Fiberglas or other suitable non-burnable material be placed around the conductor elements and around the thermostat to guard against possible burning or scorching of the enclosed parts by contact with the tube 13. This enclosing sleeve 41 contributes additionally to the above indicated difference between the temperature of liquid in which the device is immersed and the rated operating temperatures of the thermostatic elements.

It is preferred to provide a cover which may be applied to the container when the heating device is placed therein. To that end, a cover 42 is provided, the top thereof being centrally apertured and provided with a compressible rubber stopper 43 which fairly snuggly but slidably fits around the stem portion 10 of the heating device so as to permit movement of the cover along said stem portion in order to adapt the cover and heater to containers of the different heights or depths. Said stopper 43 is so designed that it can be positioned at any location on the stem and entirely removed for replacement or cleaning. For example, said stopper may be a tapered member apertured to fit the stem and slit as indicated at 44 to permit its removal from said stem. This cover structure is, normally permitted to remain on the upper stem portion of the device. A vent 45 is provided in the cover.

Various changes in the described structure may be made while retaining the principles of the invention.

I claim:

1. Hot liquid dispensing apparatus according to claim 7 wherein there is provided a cover for closing the mouth of said container, said cover having an opening of a size to freely permit the passage of said heater stem portion through said opening, and a grommet positioned in said opening and seated on the adjacent cover portion and snuggly but slidably receiving said stem to enable said cover to be selectively positioned along the length of said stem to adapt the heater and said cover to containers of various depths.

2. An immersion heater of the class described, comprising a tube bent to provide a member having a stem portion, an elongated heating portion extending transversely of said stem portion in T-forming relation thereto and spaced therefrom in the direction of the length thereof, and a connecting portion extending upwardly and inwardly from one end of said heating portion to said stem portion, a substantially rigid cartridge-type electrical heating element in said heating portion, said heating portion being initially open at its other end to permt insertion of said heating element, and means closing said last mentioned end of said heating portion.

3. An immersion heater of the class described comprising an elongated tube bent to provide an upper stem portion and a goose-neck lower portion, said goose-neck portion terminating in a lower end part which extends transversely of said stem portion, an electrical heating element housed in said lower end part, an electrical circuit making and breaking thermostat housed in said goose-neck portion, electrical wiring connecting said heating element and thermostat and extending through said tube and out of the upper end of said stem portion for connection to a source of electrical current, and means sealing the upper end of said tube comprising an adapter tightly fitting in and sealed to the upper end portion of said tube, said adapter having an upper end portion projecting from said tube and being apertured for the passage of said electrical wiring through said adapter, the projecting end portion of said adapter being externally screw threaded and internally countersunk from its upper end, a grommet of compressible material fitted around said electrical wiring and seated in said countersunk adapter portion, and a cap threaded on said adapter and compressing said grommet to cause the same to sealingly engage said wiring and said countersunk adapter portion.

4. An immersion heater of the class described, comprising a rod like member having an elongated stem portion, an elongated heating portion extending transversely of said stem portion, said heating portion being spaced from said stem portion in the direction of the length thereof, a connecting portion extending from an end of said heating portion to said stem portion, flange means extending transversely of said heating portion adjacent to and spaced from the free end thereof so as to cause an end portion of the same to project from the outer face of said flange, said flange being operative to support said heating portion in spaced relation to any flat surface on which the heater may be laid, and said projecting end portion serving to prevent standing of the heater in an upright position on a face of said flange.

5. An immersion heater of the class described, comprising a rod like member having an elongated stem portion, an elongated heat discharging portion extending transversely of said stem portion, said heat discharging portion being spaced from said stem portion in the direction of the length thereof, a connecting portion extending from an end of said heat discharging portion to said stem portion, flange means extending transversely of said heat discharging portion adjacent to but in spaced relation to the free end thereof for supporting the same in spaced relation to any flat surface on which the heater may be laid, and cap means telescopically fitting over and sealed to said free end of said heat discharging portion outwardly of said flange so as to prevent standing of the heater in an upright position on a face of said flange.

6. An immersion heater of the class described, comprising a tubular member having an elongated stem portion, a heat discharging portion extending transversely of said stem portion, said heat discharging portion being spaced from said stem portion in the direction of the length of the latter, a connecting portion extending from an end of said heat discharging portion to said stem portion, an electrical heating element disposed in said heat discharging portion, electrical wiring extending from said heating element through said tubular member and out of the free end of said stem portion, means telescopically fitting and sealed to the free end of said heat discharging portion, and means electrically grounding the heater comprising a conductor having an end portion interposed between said means and free end so as to be mechanically locked and electrically connected to said tubular member, said conductor being a part of said wiring and having its other end provided with a terminal for connection to a grounded electrical conduit system which houses current supply wiring to which said heater element is adapted to be connected.

7. An electrical immersion heater comprising a bent tube having an upper stem portion, an elongated lower portion extending transversely of said stem portion in T-forming relation thereto, said lower portion being spaced from said stem portion in the direction of the length of said stem portion, and an intermediate portion extending from and connecting one end of said lower portion to one end of said stem portion, an electrical heating element and a current flow controlling thermostat positioned in said lower portion, conductors connecting said heating element and thermostat in an electrical circuit and extending out of said stem portion for connection to a source of electrical energy for energizing said heating element, the heater being insertable into a container by endwise movement of said lower portion through the mouth of the container and adjustment of the heater during its passage through said mouth to position the length of said lower portion adjacent the bottom of the container, whereby the heater is easily insertable and positionable as aforesaid in a container having a mouth opening of a diameter which is much smaller than the length of said lower portion, said stem and connecting portion being of a length to cause said stem portion to extend out of the container when said lower portion is positioned adjacent the container bottom as aforesaid.

8. An electrical immersion heater comprising a bent tube having an upper stem portion, an elongated lower portion extending transversely of said stem portion in T-forming relation thereto, said lower portion being spaced from said stem portion in the direction of the length of said stem portion, and an intermediate portion extending from and connecting one end of said lower portion to one end of said stem portion, an electrical heating element and a current flow controlling thermostat positioned in said lower portion, electrical conductors connecting said heating element and thermostat in an electrical circuit and extending out of said stem portion for connection to a source of electrical energy for energizing said heating element, the heater being insertable into a container by endwise movement of said lower portion through the mouth of the container and adjustment of the heater during its passage through said mouth to position the length of said lower portion adjacent the bottom of the container, whereby the heater is easily insertable and positionable as aforesaid in a container having a mouth opening of a diameter which is much smaller than the length of said lower portion, said stem and connecting portion being of a length to cause said stem portion to extend out of the container when said lower portion is positioned adjacent the container bottom as aforesaid, and a container cover slidably positioned on said stem for closing the mouth of the container when the heater is positioned therein as aforesaid.

9. An immersion heater of the class described comprising an elongated tube bent to provide an upper stem portion, a lower portion extending transversely of said stem portion in T-forming relation thereto and which is spaced from said stem portion in the direction of the length of the latter, and a connecting portion extending upwardly and angularly inwardly of the length of said lower portion from an end thereof to an end of said stem portion, an electrical heating element and an electrical circuit making and breaking thermostat housed in said lower portion, and electrical wiring connecting said heating element and thermostat and extending through said tube and out of said stem portion for connection to a source of electrical current.

10. An immersion heater of the class described comprising an elongated tube bent to provide an upper stem portion, a lower portion extending transversely of said stem portion in T-forming relation thereto and which is spaced from said stem portion in the direction of the length of the latter, and a connecting portion extending upwardly and angularly inwardly of the length of said lower portion from an end thereof to an end of said stem portion, an electrical heating element and an electrical circuit making and breaking thermostat housed in said lower portion in spaced relation to said heating element, and electrical wiring connecting said heating element and thermostat and extending through said tube and out of said stem portion for connection to a source of electrical current.

11. An immersion heater of the class described comprising a tube bent to provide an elongated stem portion, an elongated heating portion extending transversely of said stem portion and spaced therefrom in the direction of the length of said stem portion, an intermediate portion extending from and connecting one end of said heating portion to said stem portion, said stem, intermediate, and heating portions being normally disposed in a common, upright, more or less vertical plane when the heater is in operative position in a receptacle, and flange means on said heating portion and extending therefrom transversely of the plane of the heater, said flange being operative to support said heating portion in spaced relation to any flat surface on which the heater may be laid in a more or less horizontal plane.

12. An immersion heater of the class described comprising a tube bent to provide an elongated stem portion, an elongated heating portion extending transversely of said stem portion and spaced therefrom in the direction of the length of said stem portion, an intermediate portion extending from and connecting one end of said heating portion to said stem portion, said stem, intermediate, and heating portions being normally disposed in a common, upright, more or less vertical plane when the heater is in operative position in a receptacle, and flange means on said heating portion and extending therefrom transversely of the plane of the heater but not materially beyond the lower side of said heating portion when in said upright position, said flange being operative to support said heating portion in spaced relation to any flat surface on which the heater may be laid in a more or less horizontal plane while permitting said heating portion to be positioned closely adjacent the bottom of a receptacle when positioned therein in said upright position.

References Cited in the file of this patent

UNITED STATES PATENTS

| | | |
|---|---|---|
| 1,824,823 | Kump | Sept. 29, 1931 |
| 1,995,886 | Jockers | Mar. 26, 1935 |
| 2,289,981 | McDonald | July 14, 1942 |
| 2,457,065 | Parmley | Dec. 21, 1948 |
| 2,471,260 | Chapman | May 24, 1949 |